May 28, 1974     R. S. FEINBERG     3,813,256
METHOD OF MAKING A HEAT RESISTANT, VAPOR FREE COOKING UTENSIL
Filed June 24, 1971
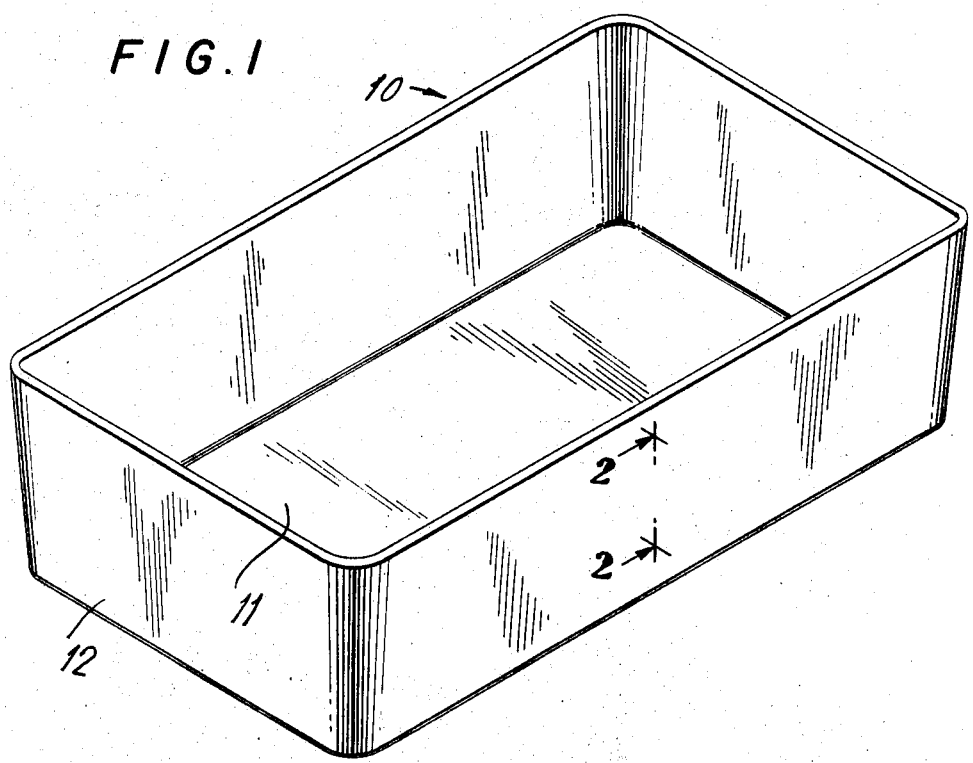
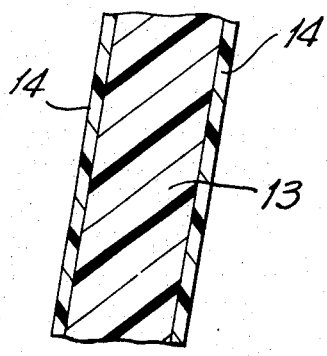
INVENTOR.
ROBERT S. FEINBERG
BY Howard C. Miskin
ATTORNEY

United States Patent Office 3,813,256
Patented May 28, 1974

3,813,256
METHOD OF MAKING A HEAT RESISTANT, VAPOR FREE COOKING UTENSIL

Robert S. Feinberg, Teaneck, N.J., assignor to Cryplex Industries, Inc., Flushing, N.Y.
Continuation-in-part of abandoned application Ser. No. 49,787, June 25, 1970. This application June 24, 1971, Ser. No. 156,298
Int. Cl. B65d 81/34
U.S. Cl. 117—47 H
6 Claims

ABSTRACT OF THE DISCLOSURE

A food-heating utensil is formed of a heat responsive gas or vapor releasing material such as paper or a thermoset cross-linked polyester substrate coated or encapsulated with a polysulfone resin, and is characterized by the substantial absence of any gas or vapor release at high temperatures and excellent surface release properties.

REFERENCE TO RELATED APPLICATION

The present application is a continuation-in-part of application Ser. No. 49,787 filed June 25, 1970, now abandoned.

BACKGROUND OF THE INVENTION

The present invention relates generally to improvements in products of paper and synthetic organic resins and it relates more particularly to an improved cooking utensil structurally formed of paper or synthetic organic resins which release vapors at elevated temperatures, as well as gases, fumes and the like.

It is a common practice to merchandise, dispense or package foods in a disposable cooking or heating utensil which serves as an eating receptacle or plate as well, so that the food, even if frozen, may be dispensed and heated in the utensil by baking, high frequency cooking or otherwise, and the heated, cooked food served in the utensil directly to the consumer. These utensils must withstand maximum food cooking or reconstituting temperatures without damage to the utensils or the food and without in any way adversely affecting the food such as by imparting undesirable tastes or odors thereto or by adversely affecting its palatability and nutritional value. Moreover, the utensil should be available in any desirable configuration, with or without partitions and with or without covers, should be of a highly attractive appearance and of any desirable color and texture, and should be very inexpensive so as to permit its use is a disposable or a throw-away article without significantly affecting the end cost of the cooked food-stuff. These utensils have many uses, such as in the preparation and service of inflight meals, packaged frozen dinners, and the like. Where the utensil contains frozen food, it must withstand thermal shock or going from below 0° F. to 300° F. and even higher.

It has been found that the use of paper or a thermoset cross-linked polyester resin for a cooking utensil offers many advantages. They are strong and can withstand high temperatures without damage or deterioration; they are relatively inexpensive, highly attractive and can be formed into any desired configuration by conventional techniques. While these paper and polyester cooking utensils possess many advantages, in most applications they possess important drawbacks when they are used to heat or cook food at relatively high temperatures, where the food is exposed to or in contact with the paper or polyester utensil. The food may stick to the utensil and may acquire a slight taste or odor which detracts from its palatability and hence limits the use of paper or polyester for cooking utensils as well as for other high temperature applications.

SUMMARY OF THE INVENTION

It is a principal object of the present invention to provide an improved article formed of paper or a synthetic organic polymeric resin or resins.

Another object of the present invention is to provide an improved heat resistant article formed of paper or a synthetic organic polymeric resin or resins in which the evolution or release of gases, fumes or vapors is substantially obviated.

Still another object of the present invention is to provide an improved heating and serving utensil which does not in any way adversely affect the food consequent to the heating of the utensil and provides excellent food release properties.

A further object of the present invention is to provide an improved article of the above nature characterized by its versatility, adaptability, low cost, attractive appearance and ease of production.

The above and other objects of the present invention will become apparent from a reading of the following description taken in conjunction with the accompanying drawing, which illustrates a preferred embodiment thereof.

In copending patent application Ser. No. 49,787 filed June 25, 1970, it has been disclosed that articles which are formed of polymeric resin compositions which release gases and vapors, when heated, particularly the thermoset cross-linked polyester resins when unreacted monomers are vaporized by heat and where volatiles caused by the degradation of the polyester resin or resins may likewise be released, when coated with a layer of a polyamide-imide or a polysulfone resin, do not release such gases and vapors and may thus be employed where their use by reason of such gases and vapors would possess undesirable drawbacks. It has been found that in addition to these resins, paper products likewise release undesirable vapors and gases when heated and such gas and vapor release is inhibited when the paper or resin product is coated with a polyphenylene oxide or polysulfone resin or mixture thereof. The polyphenylene oxide or polysulfone coatings not only function as fume, gas or vapor barriers, but are themselves highly stable, odorless, relatively scratch-resistant, highly craze-resistant, exhibit the ability to adhere to the polyester substrate, and when supported by the substrate are highly dimensionally stable under heat and provide excellent food-release properties. Moreover, the substrate-supported coating is highly resistant to thermal shock, so that the utensil containing the food can be taken directly from the freezer and placed in an oven or from an oven into ice water. The polyphenylene oxide resin may be unmodified, as typified by Noryl, a modified polyphenylene oxide resin marketed by the General Electric Company.

Accordingly, the present invention contemplates the provision of a heat-resistant, vapor-free, paper or synthetic organic polymeric article, comprising a heat-responsive, vapor-releasing paper or organic polymeric resin substrate having a coating formed of a polyphenylene oxide or a polysulfone resin or a combination thereof. The improved article is advantageously a food heating or baking utensil which may also function as a service receptacle, and the substrate is advantageously paper or a thermoset cross-linked polyester resin, and the coating advantageously fully envelops the substrate and is of a thickness between ½ mil and 15 mils.

The improved article may be used to heat and bake all types of food, including frozen food, without imparting any undesirable taste or odor thereto, or adversely affecting the palatability or nutritional value of the heated food. The article is inexpensive, of attractive appearance, has excellent food-release characteristics, and may be produced in any desired shape by the use of conventional equipment and techniques.

BRIEF DESCRIPTION OF THE DRAWINGS

FIG. 1 is a top front perspective view of a preferred embodiment of the present invention; and FIG. 2 is an enlarged fragmentary sectional view taken along line 2—2 in FIG. 1.

DESCRIPTION OF THE PREFERRED EMBODIMENT

Referring now to the drawing which illustrates a preferred embodiment of the present invention, the reference numeral 10 generally designates the improved article which is illustrated merely by way of example as an open-topped deep rectangular heating dish or tray, it being understood that the article 10 may assume any desired shape and size, with or without a cover. The dish 10 includes a flat, round-cornered rectangular base wall 11 and integrally formed front, rear and end walls 12 flaring upwardly and outwardly from the peripheral of base 11 and joined by rounded corners.

The body or main structural core of the article 10 is defined by a structurally self-supporting, integrally formed paper or polyester resin substrate 13, which is completely covered along the opposite faces and edges thereof by an adherent layer 14 of a polysulfone or polyphenylene oxide resin which advantageously completely envelops or encapsulates substrate 13.

Any of the polyester molding compounds which are substantially heat-resistant to temperature of about 450° F. to 500° F., and which are structurally stable at these temperatures, may be employed for the substrate 13 and the body member or core may be molded and formed in the manner earlier described. Where the substrate 13 is formed by liquid thermoset injection molding techniques, the base resins for the polyester system can be made from saturated acids, such as phthalic acid, used in the phthalic anhydride form due to its availability, isophthalic acid, and terphthalic acid. Unsaturated acids that can be used in the preparation of the polyesters, which are suitable for liquid thermoset injection are the cis-trans isomers of maleic anhydride and fumaric acid. In addition, some principal alcohols suitable for the polyester synthesis for liquid thermoset injection processes are the glycols containing two hydroxyal groups. However, monohydric alcohols, to terminate chain growth and polyhydric alcohols for branching in the polyester chain and for increasing molecular weight, can also be employed. Dual resin systems cross-linked with various monomers for quick cure, high hot strength, suitable tensile strength, tack-free surface, long pot life, dimensional stability and shrink resistance are also employed. These monomers vary and could be any of the following or any combination of the following: methyl methacrylate, styrene, vinyl toluene, alpha methyl styrene, divinyl benzene, dichloro-styrene, diallyl phthalate, triallyl cyanurate, tertiary butyl styrene, and any other suitable cross-linking monomer for a polyester system.

Suitable catalysts for these systems include singularly and in combination many of the well-known catalysts, such as benzoyl peroxide, tertiary butyl perbenzoate, tertiary butyl peroctoate, tertiary butyl hydro-peroxide, and others. Also added to polyester systems are a variety of fillers and modifiers that are added in greater or lesser amounts to produce the desired end properties. Suitable additives range from various kinds of silicas, milled fiberglass, fiberglass roving, pigments, and hydrated alumina, to asbestos, wood pulp, liquid extenders, plasticizers, and many other types of modifiers.

Where the substrate 13 is formed of paper, it may be produced in any suitable manner and thickness and is preferably of a cellulosic fiber and fabricated by conventional techniques, for example, molded from a slurry or shapeable mass or otherwise produced, such as pressed from board stock.

The coating 14 is formed of a polyphenylene oxide, modified or unmodified, or polysulfone resin, or combinations thereof.

Polysulfone is commercially supplied in pellet form and in the natural state is light amber in color. Pigmented polysulfone is also available in white, blue, reddish brown, and others colors and may be advantageously used as well. The raw pellets as supplied by the manufacturer contain an excess amount of residual solvent causing a definite obnoxious pungent odor to the compound. This odor must be eliminated before the pellets would be suitable for the subject coating process. It has been found that the residual solvent may be advantageously eliminated from the polysulfone resin by boiling the pellets in water, for example, for 1½ hours, draining the wash water, and thereafter heating the pellets in thin layers, preferably of about ½ inch or less in an exhaust oven, for example, for four hours at 350° F. The thus treated pellets are dry, free of residual solvent and odorless, and still retain their physical properties.

The washed, dried pellets prepared as above are dissolved in any of the following solvents: acetophenone, chloroform, cyclohexanone, chlorobenzene, DMF (dimethylformamide), dioxane, methylene chloride, NMP (N-methylpyrrolidone), tetra-hydrofuran, and other suitable solvents. These solvents produce resin solutions from very low solid concentrations up to approximately 30% solids by weight. In addition to the solvents mentioned, solvent blends serving as solvent dilutants can also be employed and these blends may contain toluene, cyclohexanone, acetone, xylene, trichloroethylene and other suitable organic solvents. The solvents and solvent diluents can be added in any number of ratios that appear to be suitable for the present coating application. For air spraying, 88% of DMF and 12% polysulfone by weight has produced a successful solution. However, trichloroethylene, cyclohexanone, and other solvents and diluents as mentioned above have been added to polysulfone solutions and have been found to be highly acceptable. What solution is employed depends upon the functional application and the required esthetics of the finished plastic product, and may be easily and readily determined.

Another technique that has been used successfully for the application of polysulfone coatings is airless spraying. Coatings applied to the substrate by an airless spray gun are very smooth, shiny, and uniformly deposited. In addition to the qualities of polysulfone coatings discussed above, these coatings also prevent the staining of the substrate material under high heat. A representative coating solution comprises (by weight): 12% polysulfone, 68% DMF, 20% trichloroethylene and to this solution is added ⁸⁄₁₀ of 1% surfactant wetting agent Triton CF–21 or X–45, both manufactured by Rohm & Haas Co. of Philadelphia, Pa. The concentration of polysulfone, DMF and other suitable agents can be varied over a fairly wide range to produce a variety of esthetic qualities of coatings within the framework and limitations of the particular end use of the coated article. Prior to airless spraying, the articles are preheated to a temperature of approximately 225° F. and then sprayed and immediately placed in an oven or in a heated environment at a temperature of approximately 225° F. until dry to the touch. The coating is then subjected to higher temperatures up to approximately 400° F. until satisfactory drying has been completed. Other polysulfone solutions used in air or airless spraying contain polysulfone in the range of about 1% to about 20%.

Although any number of dipping techniques may be successfully employed, one technique found to be highly suitable is to dip the substrate heated from 200° F. to 325° F. in a solution of 6% polysulfone and 94% DMF.

The dipped article is withdrawn from the dip solution and placed in the oven at approximately 300° F. to 350° F. for about ten minutes. The piece is removed from the oven, redipped while heated in the 6% polysulfone solution, and placed in the oven again at about 300° to 350° F. for about ten minutes. Other solutions containing from about 1% to about 30% polysulfone can be used depending on the application.

The articles that are dipped can be heated or at room temperature, depending upon the application and depending upon the esthetics required. It has been found that room temperature dipping of the molded polyester article tends to produce a more shiny, glossy, esthetically pleasing coating. Also, there is a distinct relationship between the drying time of the solvent and the esthetics of the finished coating. The heat from the oven tends to serve two purposes. These purposes are: (1) to drive the solvent system from the coating, and (2) to heat-solidify the surface of the coating and to create good adhesion to the substrate material. The temperature of the molded polyester plastic product to be dipped or sprayed, the present polysulfone solids in either a dipping solution or spraying solution, the rate of withdrawal of the product from the dipping tank, the length of time a plastic product is to be sprayed, the solvent mixtures made from any combination of solvents discussed above, the number of times the product is to be dipped or sprayed, and the length of time and the temperature to which the various coatings are to be subjected, are all variables which are adjusted depending on the end use application of the finished plastic product. Coating thicknesses of from about ½ mil to about 15 mils are highly suitable for the present purpose, with the coating thickness depending on the temperature range of the end use. Polysulfone pellets are commercially availabe from Uion Carbide Corp.

The procedure employed in applying a polyphenylene oxide coating to the substrate 13, although broadly similar to, differs somewhat from that employed in applying a polysulfone coating. A coating composition which has been employed to great advantage consists of a solution containing 10 parts by weight of Noryl, a modified polyphenylene oxide resin, it being noted that the unmodified resin may be substituted in whole or in part for the modified resin, 90 parts by weight of toluene, and 0.8% of said solution of the nonionic surfactant Triton X-45 marketed by Rohm and Haas, which surfactant is the reaction product of octylphenol and ethylene oxide.

Unlike the application of the polysulfone resin, the polyphenylene oxide solution is advantageously applied to the substrate at room temperature, for example 70° F. to 80° F., such as by air or airless spraying the solution onto the substrate. The solution coated substrate, whether the substrate 13 be a resin or a paper such as for example, paper board or fiber board is then heated to about 225° F. in an oven or the like for about 0.5 to 1 minute to evaporate the solvent and the temperature of the coated product is then raised to about 425° F. for 15 minutes or more to substantially remove all traces of the toluene solvent and integrate the coating and effect the high adhesion thereof to the substrate. The finished product has a highly adherent continuous smooth glossy coating of attractive appearance which is gas impervious, non-tacky at normal food cooking temperatures, odor free, and highly grease resistant and provides an excellent food release and non-sticking surface for food reconstitution purposes.

Methods other than spraying may be employed in applying the polyphenylene oxide coating to the substrate, for example dipping, brushing or the like and the resin concentration and the solvent may be modified and solvent diluents employed. For example, the concentration of the polyphenylene oxide solids in the solution thereof may be widely varied, for example between 0.5% and 20%, and the toluene may be substituted in whole or in part by other volatile solvents and may have volatile dilutants added thereto which are compatible with the polyphenylene oxide resin and the other solvents in that the solution remains stable and the resin does not precipitate. Examples of such solvents and dilutants are dimethyl formamide, trichloroethylene and the like. Moreover, concentration of the surfactant may be varied and other nonionic surfactants than Triton X-45 employed, for example, the alkylaryl polyether alcohols or the alkyl phenyl ethers of polyethylene glycol.

It should be noted that while the modified polyphenylene oxide resin such as Noryl is preferred, because of its appearance, it may be substituted in whole or in part by the unmodified poly-phenylene oxide resin, and the polyphenylene oxide resin may be substituted in part by polysulfone resin and the mode of application and the solvents employed adjusted in the manner which is clear from the above. For example, the resin may include from 3 to 9 parts of polyphenylene oxide resin and from 3 to 9 parts of polysulfone resin. It should be noted that the heating of the coated article to about 425° F. for about 15 to 20 minutes or more, whether the coating is polyphenylene oxide, polysulfone or a mixture thereof, increases the adhesion of the coating to the substrate. Except as noted above the use and application of the polyphenylene oxide coating with or without the polysulfone resin are similar to those of the polysulfone resin as described earlier.

Another form of this invention would be to encapsulate the substrate with the selected material. An upper and lower surface made of polysulfone, polyphenylene oxide or combinations thereof is thermoformed or pressure formed, respectively, to make a close fit with the substrate and the edges sealed in any convenient manner, such as heat-sealing, welding or using adhesive and the like.

While polyester substrates were discussed in the specific embodiments, other plastic substrates could be used, such a epoxy, polycarbonate, nylon, polyphenylene oxide, etc.

While there has been described and illustrated preferred embodiments of the present invention, it is apparent that numerous alterations, omissions and additions may be made without departing from the spirit thereof.

What I claim is:

1. A method of making a heat resistant, vapor free cooking utensil having an excellent food-release surface comprising:
    (a) forming a substrate from a heat responsive vapor releasing material selected from the class consisting of paper and a thermoset cross-linked polyester resin in the form of a cooking utensil;
    (b) placing polysulfone resin in boiling water and maintaining said resin in said water for about 1½ hours;
    (c) separating said resin from said water;
    (d) heating said separated resin at about 350° F. to at least dry said resin and free said resin from residual solvent;
    (e) mixing the resin of step (d) with a solvent to obtain a solution of 0.5% to 30% of solids by weight;
    (f) coating at least one surface of the substrate utensil with the said solution of step (e); and
    (g) heating said coated utensil to dry said coating.

2. The method of claim 1 wherein the resin heated in step (d) is maintained at said temperature for about four hours.

3. The method of claim 1 wherein said polysulfone solution contains from about 1% to about 20% polysulfone and the coating is sprayed on the surface of said substrate, said substrate having been preheated to a temperature from about 200° F. to 325° F. prior to application of said coating.

4. The method of claim 3, wherein the solvent of the polysulfone solution is selected from the group consisting of acetophenone, chloroform, cyclohexanone, chlorobenzene, dimethylformamide, dioxane, methylene chloride, N-methylpyrrolidone and tetrahydrofuran.

5. The method of claim 3, wherein the resin solution further includes a surfactant wetting agent.

6. The method of claim 3, wherein said polysulfone solution contains 68% dimethylformamide by weight and 20% trichloroethylene by weight.

References Cited

UNITED STATES PATENTS

| | | | |
|---|---|---|---|
| 3,471,587 | 10/1969 | Whittemore et al. | 117—138.8 A X |
| 3,431,132 | 3/1969 | Bacon et al. | 117—63 X |
| 3,449,153 | 6/1969 | Saligny et al. | 117—63 |
| 3,661,617 | 5/1972 | Serlin | 117—63 X |
| 2,972,553 | 2/1961 | Hess | 117—47 H |
| 3,170,892 | 2/1965 | Busse | 117—93.31 X |
| 2,865,765 | 12/1958 | Allen | 99—171 LP X |

RALPH HUSACK, Primary Examiner

U.S. Cl. X.R.

99—171 LP, 192 P; 117—94, 95, 104, 138.8 F, 155 R